(12) United States Patent
Lombardi et al.

(10) Patent No.: US 7,525,292 B2
(45) Date of Patent: Apr. 28, 2009

(54) COMPENSATOR DEVICE FOR STABILISING THE POWER OF ALTERNATORS IN ELECTRICAL POWER GENERATING PLANTS

(75) Inventors: Filippo Lombardi, Montoggio (IT); Roberto Mastretta, Genoa (IT)

(73) Assignee: Ansaldo Energia S.p.A., Genova (IT)

( * ) Notice: Subject to any disclaimer, the term of this patent is extended or adjusted under 35 U.S.C. 154(b) by 361 days.

(21) Appl. No.: 10/566,746

(22) PCT Filed: Jul. 30, 2004

(86) PCT No.: PCT/IB2004/002480

§ 371 (c)(1),
(2), (4) Date: Jul. 27, 2006

(87) PCT Pub. No.: WO2005/013462

PCT Pub. Date: Feb. 10, 2005

(65) Prior Publication Data

US 2007/0120424 A1    May 31, 2007

(30) Foreign Application Priority Data

Aug. 1, 2003   (IT)   ........................... MI2003A1595

(51) Int. Cl.
*H02P 11/00*   (2006.01)
(52) U.S. Cl. .................. 322/17; 322/16; 322/23
(58) Field of Classification Search ............. 322/16, 322/17, 23
See application file for complete search history.

(56) References Cited

U.S. PATENT DOCUMENTS

| | | | | |
|---|---|---|---|---|
| 6,756,761 B2* | 6/2004 | Takahashi et al. | ........... | 318/599 |
| 7,034,508 B1* | 4/2006 | Sasaki et al. | ................... | 322/28 |
| 7,078,826 B2* | 7/2006 | Xu et al. | ...................... | 290/52 |
| 7,106,029 B2* | 9/2006 | Inokuchi et al. | ............... | 322/28 |
| 7,368,892 B2* | 5/2008 | Uematsu et al. | ............... | 322/27 |

OTHER PUBLICATIONS

Chang, G.K., et al., "Modified integral variable structure model following control of synchronous generator", Proceedings of the American Control Conference, vol. 2, Jun. 2001, pp. 823-828.

Oonsivilai, A., et al., "A self-organizing fuzzy power system stabilizer", IEEE Canadian Conference on Electrical and Computer Engineering, vol. 1, May 1998, pp. 197-200.

Senjyu, T., et al., "Cooperative control of AVR and GOV for improving transient stability of power systems using fuzzy controller", Proceedings of the Second International Forum on Applications of Neural Networks to Power Systems, Apr. 1993, pp. 35-40.

(Continued)

*Primary Examiner*—Nicholas Ponomarenko
*Assistant Examiner*—Iraj A Mohandesi
(74) *Attorney, Agent, or Firm*—McCarter & English, LLP

(57) ABSTRACT

Compensator device, for the stabilisation of electromechanical oscillations destined to provide a reference signal to a voltage regulator device of a synchronous alternator for the delivery of electrical power to a distribution network, said device including:

first processing means to receive electrical measurement signals representing operative parameters characteristics of said synchronous alternator and/or to generate an electrical signal to be controlled; and a first electrical signal corresponding to a sliding surface of a control of the "sliding modes" type, second processing means of the first signal to generate the reference signal so that it has a first order "sliding modes" profile.

24 Claims, 7 Drawing Sheets

OTHER PUBLICATIONS

International Search Report dated Dec. 29, 2004 issued in connection with International Patent Application No. PCT/IB2004/002480.

Slotine, et al., Applied Nonlinear Control, Hall International, Englewood Cliffs, New Jersey, 1991, Chapters 6 and 7.

Utkin V.I., Sliding Modes in Control and Optimization, SpringerVerlag, Berlin, 1992, Cover and Table of Contents.

Bartolini, et al., On the Robust Stabilization of Nonlinear Uncertain Systems with Incomplete State Availability, Transactions of the ASME, vol. 122, Dec. 2000.

Saccomanno, Sistemi Elettrici per l'Energia - Analisi e Controllo, 1992: Cover and Table of Contents (in Italian only).

* cited by examiner

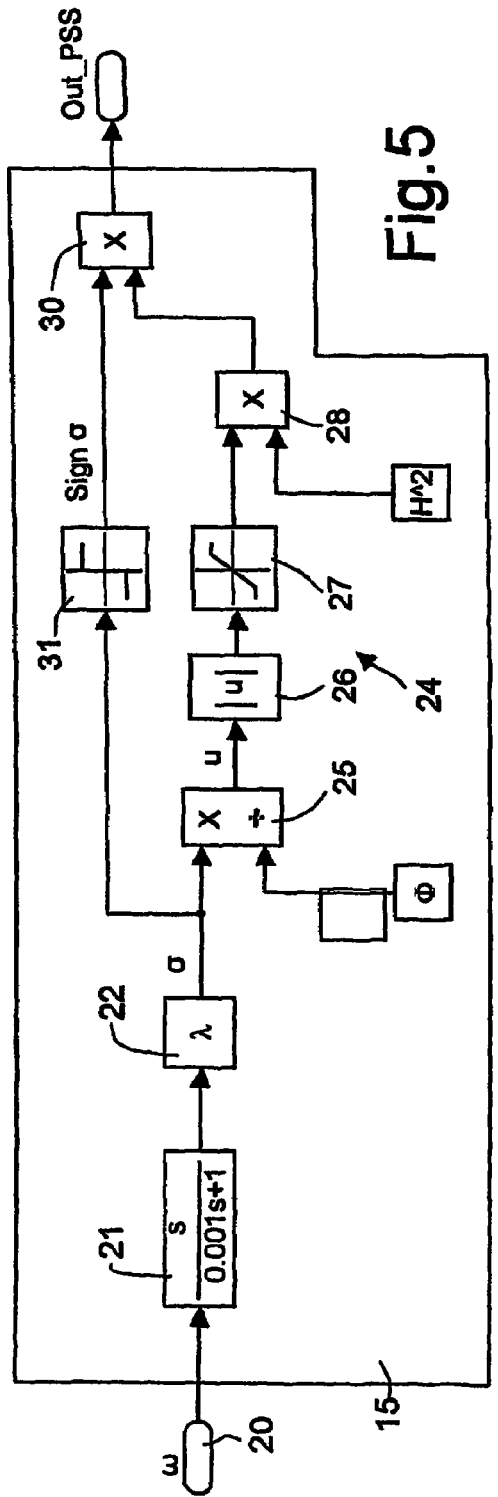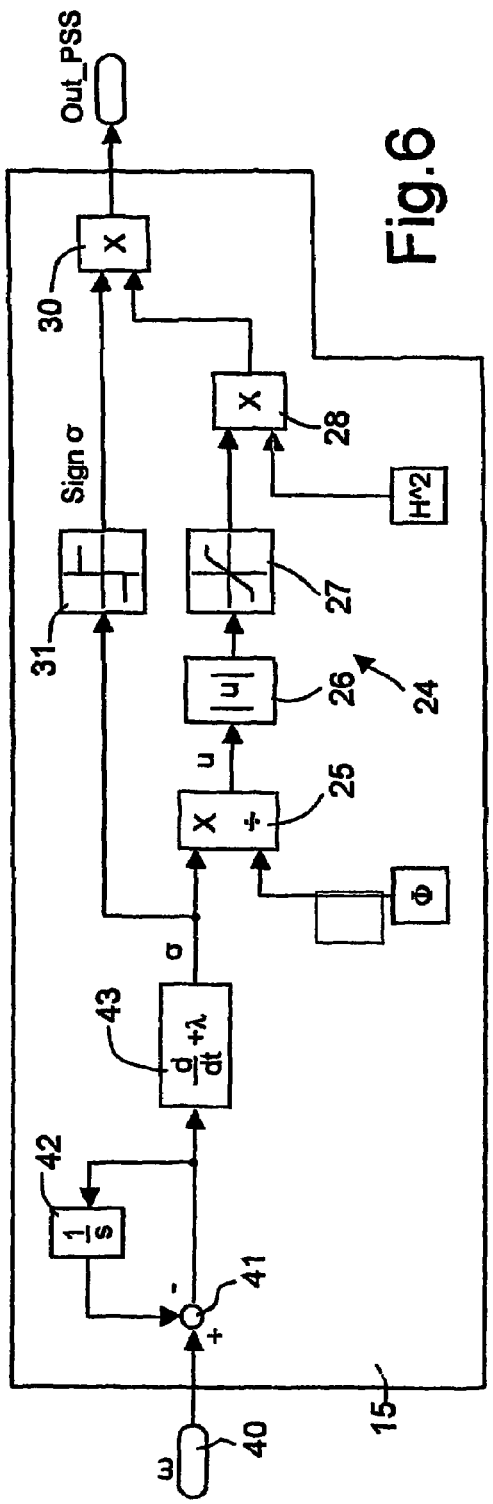

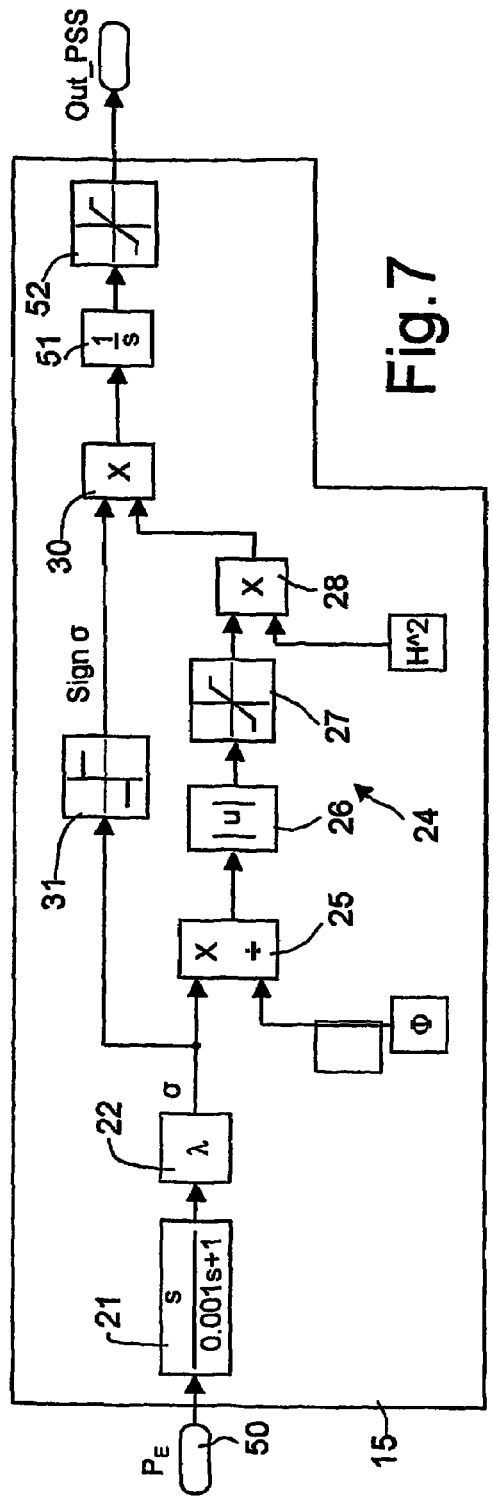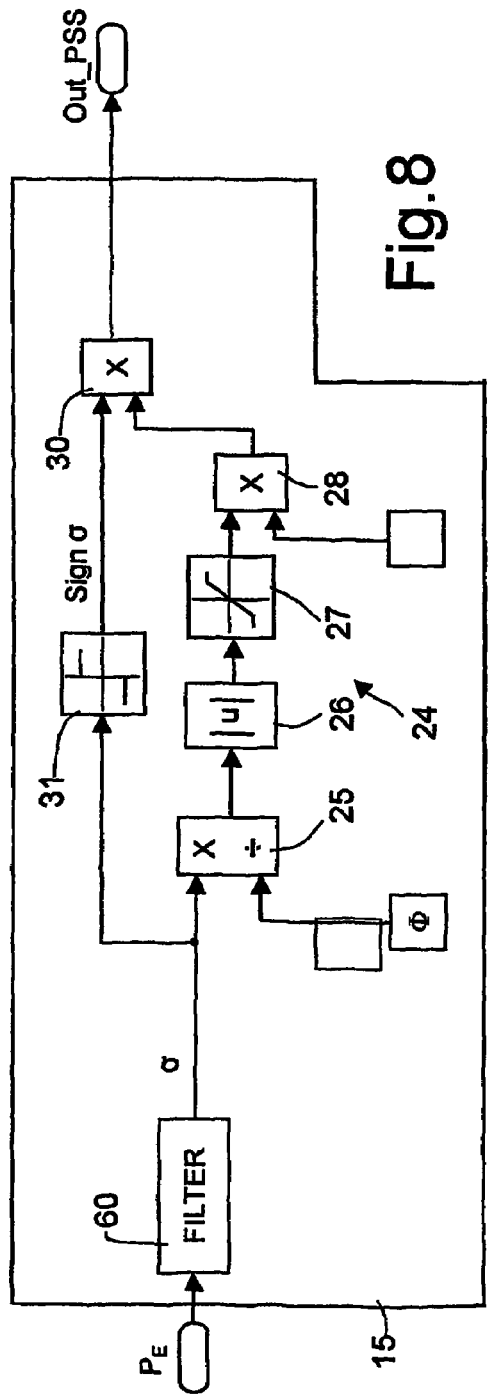
Fig. 7
Fig. 8

COMPENSATOR DEVICE FOR STABILISING THE POWER OF ALTERNATORS IN ELECTRICAL POWER GENERATING PLANTS

TECHNICAL FIELD

The present invention relates to techniques for regulating and controlling the electrical quantities of synchronous machines used in electrical power generating plants. In particular, it pertains to alternator excitation systems and, more explicitly, the automatic control processes with which the new digital voltage regulators and the new stabilising signals (PSS=Power System Stabilisers) contained therein are achieved.

BACKGROUND ART

Considering, by way of example, a conventional thermo-electric plant, we observe that each of its generating set comprises a (gas or steam) turbine and a synchronous alternator.

The alternator converts the mechanical energy produced by the turbine into electrical energy to be delivered, in general, on the national electrical supply net.

Both the turbine and the alternator are operated under the control of their respective automatic regulating system:

the speed/load regulator for the turbine, the voltage regulator for the alternator.

The voltage regulator for the alternator, often identified with the acronym AVR (Automatic Voltage Regulator), mainly serves the function of automatically regulating the electrical stator quantities of the alternator (voltage, reactive power, power factor cos φ), Moreover, a compensator or stabiliser device PSS (Power System Stabiliser) is associated with the voltage regulator AVR and generates stabilising signals to be provided to the regulator, such as to have a relevant role for limiting problems relating to the known phenomenon of local electromechanical swings.

This PSS stabiliser serves the function of correcting, by means of the generated stabilising signals, the excitation of the synchronous alternator G with appropriate transient compensating pulses which, delivered at determined instants during load variations thereof (e.g. load connections and disconnections), reduce and dampen the consequent electromechanical swings of the turbine-alternator arrangement.

Today, the standards that set the operating specifications of energy production plants are particularly strict on the damping of electromechanical swings. In other words, such standards require the delivered electrical power to be stabilised and, hence, the electromechanical swings to be dampened in short times and after a few cycles (e.g. after 3-4 oscillations).

According to conventional technologies, the "PSS" function acts based on the variations of its input quantities, which are active power ($P_E$) and frequency (f), currently measured at the alternator terminals.

One limitation of these conventional compensator devices is that their correct operation requires an accurate knowledge of the physical-mathematical model of the process to be controlled, and that their optimisation is centred only on a narrow working area of the alternator.

Since an accurate knowledge of the process parameters is very difficult, especially when they change over time, conventional compensator device cannot provide sufficient and optimised performance.

Moreover, control laws of prior art compensator devices are based on a high number of both parameters and of possible combinations thereof.

This also makes yet more critical and particularly complex all calibration operations, which, therefore, must essentially be based on the experience and sensitivity of the commissioning operator.

DISCLOSURE OF THE INVENTION

The object of the present invention is to provide a "PSS" compensator device which does not have the aforementioned limitations and drawbacks of traditional devices.

The object of the present invention is achieved by a device according to claim 1.

Preferred embodiments of the present invention are defined by the dependent claims.

BRIEF DESCRIPTION OF THE DRAWINGS

The advantages and characteristics of the present invention shall become readily apparent from the following description of preferred embodiments thereof, provided purely by way of non limiting indication, with reference to the accompanying figures, in which:

FIGS. 3 through 9 schematically show, respectively, a first, a second, a third, a fourth, a fifth, a sixth and a seventh preferred embodiment of a stabiliser according to the invention;

FIG. 4 schematically shows a second preferred embodiment of a stabiliser according to the invention.

PREFERRED EMBODIMENT OF THE INVENTION

It should be noted that the complete comprehension of the theoretical analysis constituting the basis of the present invention requires knowledge of the physical laws relating to thermo-electrical plants, as well as knowledge of the control theory known as "sliding modes".

With reference to "sliding modes", documents which may provide general information, useful for a greater understanding of the teachings of the present invention, are:

"Applied Nonlinear Control", Slotine J. J. and Li W., Hall International, Englewood Cliffs, N.J., 1991; <0}

"Sliding Modes in Control and Optimization", Utkin V. I., SpringerVerlag, Berlin, 1992;

"On the Robust Stabilization of Nonlinear Uncertain Systems with Incomplete State Availability", G. Bartolini, A. Levant, A. Pisano, E. Usai, Trans. Of the ASME, Vol. 122, December 2000.

Figure 1:
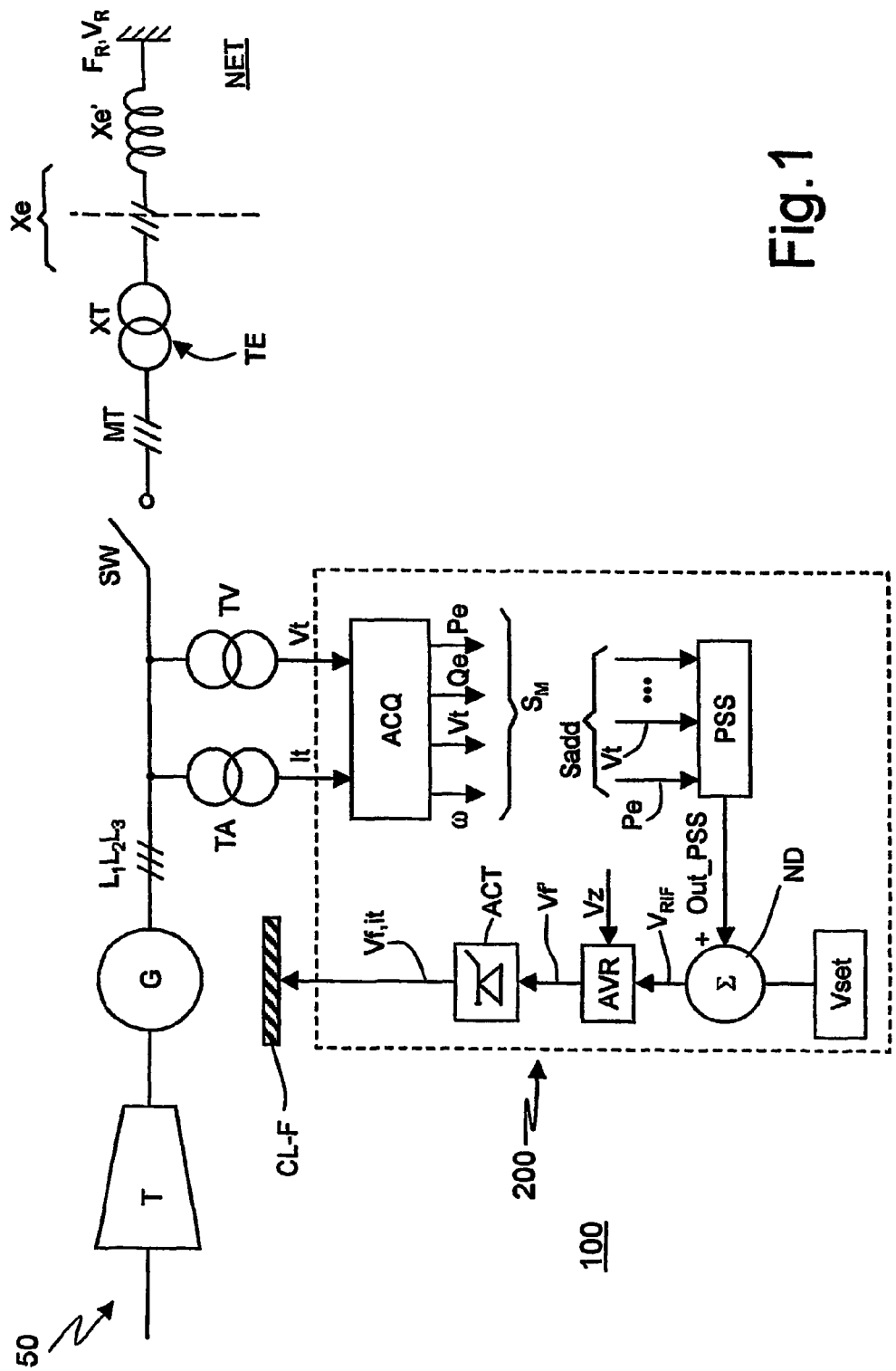
FIG. 1 schematically shows a thermo-electric plant for the production of energy.

FIG. 1 shows, in extremely schematic fashion, a thermo-electrical plant 100 including an energy production unit 50 and a static exciter 200, in accordance with the present invention.

The plant 100 is preferably destined to provide electrical energy to a high voltage AT national electrical distribution network NET.

The production unit 50 comprises a prime mover T (e.g., a steam or gas turbine), such as to provide an adequate motive torque to a synchronous alternator G mechanically connected on the same shaft as the turbine T.

The synchronous alternator G comprises a respective rotor and a respective stator (not shown) and, when it is operative, it converts the mechanical energy supplied by the prime motor T into adequate electrical energy to a three-phase electrical system (partly shown schematically in FIG. 1 by means of lines L1, L2, L3), making it available on its own stator.

The three-phase electrical phase which follows the alternator G is characterised by quantities which are controlled by a speed/load regulator for the turbine T (not shown) and by a voltage regulator AVR for the alternator G included in the exciter 200.

The alternator G can be connected to a step-up transformer TE by means of a conventional machine switch SW connected along the lines L1-L3. The step-up transformer TE allows to adapt the low voltage electrical energy MT, produced by the generator G, to the high voltage energy AT of the national electrical distribution network NET.

The prime mover T, the turbine regulator, the alternator G are conventional, and hence their detailed description is not necessary. According to the particular embodiment shown in FIG. 1, the exciter 200 comprises a measurement acquisition and processing module ACQ-M, a compensator or stabiliser device PSS (Power System Stabiliser) and a voltage regulator AVR.

The measurement acquisition and processing module ACQ can receive at respective inputs at least a first measurement signal $v_t$ and a second measurement signal $i_t$. The first measurement signal $v_t$ and the second measurement signal $i_t$ are, respectively, indicative of the voltage and of the current present at the stator of the alternator G and hereafter they shall be called, more briefly, machine voltage and current.

The machine current and voltage, $i_t$ and $v_t$, are obtainable, respectively, by means of measuring transformers (of current TA and of voltage TV) connected to the three-phase system, for example, upstream of the switch SW.

The measurement acquisition and processing module ACQ can acquire the two indicated measurement signals and process them to condition the signals themselves and/or to provide measurement signals $s_M$ which are indicative of the current values of one or more appropriate electric stator quantities, such as angular frequency/velocity ω, active power $P_E$, reactive power Qe, delivered at each instant by the unit 50.

Measurement acquisition and processing modules ACQ suitable for the present invention are known and, therefore, they are not described in detail herein.

The voltage regulator (also called primary voltage regulator) is connected to an actuator device ACT. The actuator device ACT (typically embodied by a conventional thyristor bridge) acts on the rotor of the alternator G by means of a field winding CL-F, obtainable in a fashion known by those skilled in the art.

As stated previously, the voltage regulator AVR serves the main function of automatically regulating one or more electrical stator quantities of the alternator G such as voltage and, advantageously, the reactive power and/or the power factor cos φ.

According to the exemplifying schematic representation of FIG. 1, the voltage regulator AVR is such as to receive as an input the first electrical measurement signal $v_t$ and an electrical reference signal $v_{RIF}$.

The voltage regulator AVR, based on the measured machine voltage $v_t$ (which has a feedback signal role) and of the reference signal $v_{RIF}$ performs an appropriate processing or computing operation in order to generate on its own output a field voltage signal $v'_f$ to be provided to the actuating device ACT. In turn, the actuating device ACT produces a field current $i_f$ and a field voltage $v_f$ that involve the field windings CL-F in such a way as to interact with the alternator G to maintain desired values of the electrical stator quantities voltage, reactive power, power factor (cos φ).

For example, the voltage regulator AVR may be made according to conventional technologies and it can be such as to implement classic computational techniques expressed by the theory of traditional automatic controls.

The stabiliser device PSS, a particular embodiment whereof shall be described farther on, is made as an interchangeable modular element and has inputs for receiving additional signals (globally designated as Sadd in FIG. 1) based on which it can generate an electrical output signal OUT_PSS which supplies a summing node ND.

The summing node ND is also provided with an external reference signal $v_{set}$, which is representative of the voltage required at the stator of the alternator G and may be set by an operator of the plant and/or by additional devices.

The sum of the output signal OUT_PSS and of the external reference signal $v_{set}$, carried out in the node ND, generates the voltage reference signal $v_{RIF}$ to be provided to the voltage regulator AVR.

The PSS stabiliser device operates so as to allow to correct the excitation of the alternator G with appropriate transient compensating pulses which, delivered in determined instants during its load variations (e.g. load connections and disconnections), reduce and dampen the consequent electromechanical swings of the unit 50.

According to a particular embodiment of the invention, the stabiliser device PSS operates on the basis of the two additional signals constituted by the machine voltage $v_t$ and by reactive power $P_E$.

As shall be described in detail farther on, advantageously, the stabiliser device PSS, used in the present invention, is such as to operate as a first order "sliding modes" controller.

To further clarify the characteristics of the invention to those skilled in the art, its features shall now be described and the mathematical laws which govern it shall be expressed.

The following discussion is based both on theoretical knowledge about electrical plants and on the "sliding modes" theory.

Consider the hypothesis in which the national network NET is an electrical grid with prevalent power, i.e. with a far greater, ideally infinite, power than the maximum power deliverable by the alternator G. This hypothesis is in good agreement with real situations.

The mathematical model whereto, hereafter, the summary of the stabilising regulator shall be described, is the classic $3^{rd}$ order model generally accepted for the analysis of electromechanical transients.

Note that in the following discussion the term "alternator" G is at times replaced with the term "machine", in accordance with common conventions in the technical field of the invention.

The electrical part of interest is represented by the transfer function relating to the voltage at the terminals of the alternator G, or machine tension which, in the original (not simplified) form of Park's representation, is:

$$V_d(p) = \frac{b_0^d + b_1^d \cdot p + b_2^d \cdot p^2}{a_0^d + a_1^d \cdot p + a_2^d \cdot p^2} \cdot V_R(p) \cdot \quad \text{Equation 1}$$

$$\frac{\sin(\delta)}{x_E} \quad \text{Axis } d \text{ component}$$

-continued $$V_q(p) = \frac{b_{0,1}^q + b_{1,1}^q \cdot p}{a_0^q + a_1^q \cdot p + a_2^q \cdot p^2} \cdot V_f(p) +$$
$$\frac{b_{0,2}^q + b_{1,2}^q \cdot p + b_{2,2}^q \cdot p^2}{a_0^q + a_1^q \cdot p + a_2^q \cdot p^2} \cdot V_R(p) \cdot$$
$$\frac{\cos(\delta)}{x_E} \text{ Axis } q \text{ component}$$

$v_t = \sqrt{v_d^2 + v_q^2}$ voltage at terminals $p = \dfrac{d}{dt}$ is the differential operator $\delta = \int (\omega - \omega_R) \cdot dt$ load angle $\omega_R$ network angular frequency in which:

$V_R$ is the electrical grid voltage of the network NET;

the coefficients $a_j^d$, $b_j^d$, $a_k^q$ and $b_k^q$ are respectively referred to the axis d and to the axis q; they contain the physical parameters (reactance values and time constants) of the machine in infinite grid.

$X_E$: external reactance (comprehensive of reactance $X_T$ of the step-up transformer and of the grid reactance X'e).

All quantities are expressed "per unit" (i.e. they are made non-dimensional by referring them to nominal quantities).

For modelling and electrical machine control, the following documents are noted:

F. Saccomanno, "Sistemi Elettrici per l'Energia—Analisi e controllo", UTET, 1992.

R. Marconato, "Sistemi Elettrici di Potenza", 2 Voll., CLUP, 1985.

The model of the $3^{rd}$ Order synchronous machine requires the simplification of Equations 1. Moreover, for the purposes of the present discussion, it will be assumed that the traditional voltage regulator AVR is inserted; hence, in addition to the simplifications made to the model of the machine, there will be those relating to its regulator AVR.

For the synthesis of the compensator PSS with the technique in accordance with the invention, system order reductions are well tolerated, provided that the relative degree of the transfer function is kept unchanged.

Thus, for example, the axis voltages d and q can be simplified as follows:

$$V_d(p) = \frac{b_0^{\prime d}}{a_0^{\prime d}} \cdot V_R(p) \cdot \frac{\sin(\delta)}{x_E} \text{ axis } d \text{ component} \qquad \text{Equation 2}$$

$$V_q(p) = \frac{b_{0,1}^{\prime q}}{a_0^{\prime q} + a_1^{\prime q} \cdot p} \cdot V_f(p) + \frac{b_{0,2}^{\prime q}}{a_0^{\prime q} + a_1^{\prime q} \cdot p} \cdot V_R(p) \cdot$$
$$\frac{\cos(\delta)}{x_E} \text{ axis } d \text{ component}$$

after elimination of non dominant and/or stabilising dynamics (conservatively).

After adequate substitutions and simplifications, and in particular assuming the component vd of the machine voltage according to the axis d to be about nil, and always leaving the relative degree unchanged, the equation of the machine voltage in closed loop can be defined as follows:

$$\frac{dv_t(t)}{dt} = a[v_t(t), \delta] + b \cdot v_{RIF}(t) \qquad \text{Equation 3}$$

where $a[v_t, \delta]$ is a function derived after appropriate substitutions and simplifications.

The variable $v_{RIF}$ is the voltage reference signal for the regulator AVR such that an adequate processing of the error $e = v_{RIF} - v_t$ will allow to zero it over time, generally asymptotically. This form of the machine voltage equation is appropriate for the synthesis of the stabilising compensator PSS according to the invention.

As a first instance, we will suppose that the measurement of the derivative of the load angle $(d\delta/dt)$ is available; i.e. the difference between rotor velocity and grid frequency. This allows to simplify and to understand, in relatively simple fashion, the functionality of the innovative technique. Thereafter with a transformation of variables, it will be indicated how it is possible to obtain, practically, the same results with measurements that are definitely more readily available on real plants.

To complete the model that allows to perform the synthesis in subject, it is necessary to define the balance equation of the shaft powers and the relationship between electrical power and load angle.

Given that:

$$T_M = \frac{J \cdot \omega_0^2}{P_0} \text{ e}$$
$$\omega(t) = \frac{\delta_0}{\omega_0} \cdot \delta + \omega_R$$

in which J is the moment of inertia of the axis line, $\omega_0$ is nominal pulsation, $P_0$ is nominal power and $\delta$ is the nominal angle, the balance equation is:

$$\frac{d\delta}{dt} = \frac{P_M(t) - P_E(t)}{T_M \cdot \frac{\delta_0}{\omega_0} \cdot \left(\frac{\delta_0}{\omega_0} \cdot \delta + \omega_R\right)} \qquad \text{Equation 4}$$

$P_M(t)$ the mechanical power supplied $$P_E(t) = \frac{V_R \cdot v_t(t)}{x_E} \cdot \sin(\delta_0 \cdot \delta)$$

the electrical power generated

Replacing the latter expression in the balance equation, an alternative relationship for machine voltage is obtained:

$$v_t(t) \equiv v_t(\delta) = \frac{P_M - T_M \cdot \frac{\delta_0}{\omega_0} \cdot \left(\frac{\delta_0}{\omega_0} \cdot \delta + \omega_R\right) \cdot \delta}{\frac{V_R}{x_E} \cdot \sin(\delta_0 \cdot \delta)} \qquad \text{Equation 5}$$

This allows to express machine voltage as a function of the angle, provided that a δ≠0; this artifice will allow, as we shall see, to describe the system under study in the canon form, necessary for the synthesis of the control.

The technique according to the invention comprises the definition of a controller whose objective is to zero a variety (surface or multi-plane) according to a principle called "Sliding-Modes". This surface is nothing other than a linear combination of the states that describe the dynamics of the system, provided that said states are represented in the form:

$$\begin{cases} \dot{x}_1 = x_2 \\ \dot{x}_2 = x_3 \\ \ldots \\ \dot{x}_n = f(x) + g(x) \cdot u \end{cases} \quad \text{Equation 6}$$

$$x \in R^n$$

the canon form.

If f(x) is uncertain but limited and g(x) is different from zero and has known sign, a control:

$$u(t) = -k(x)^2 \cdot \text{sign}(\sigma) \text{ and} \quad \text{Equation 7}$$
$$\sigma(t) = \left(\frac{d}{dt} + \lambda\right)^{n-1}$$
$$x_1 = c_1 \cdot x_1 + c_2 \cdot x_2 + \ldots + x_n$$

and its derivative $$\dot{\sigma}(t) = \text{grad}(\sigma) \cdot \dot{x},$$

if $k(x)^2$ is as large as to comply with the relationship $$\frac{1}{2} \cdot \frac{d\sigma^2}{dt} < -\eta \cdot |\sigma|,$$

is such that we have σ→0 and $\dot{\sigma}$→0 in a finite time.

In these conditions there is an attractive motion on σ=0 which is called "sliding-modes".

Therefore, the system is defined in the required form:

$$\frac{d\delta}{dt} = \dot{\delta} \quad \text{Equation 8}$$
$$\frac{d\dot{\delta}}{dt} = \ddot{\delta}$$
$$\frac{d\ddot{\delta}}{dt} = F(\delta) + G(\delta) \cdot v_{RIF}$$

in which:

$$F(\delta) = \frac{P_M - \frac{V_R}{x_E} \cdot \left[a(v_t, \delta) \cdot \sin(\delta) + \delta_0 \cdot \dot{\delta} \cdot v_t \cdot \cos(\delta)\right] - T_M \cdot \frac{\delta_0}{\omega_0} \cdot \dot{\delta}^2}{\left(\frac{\delta_0}{\omega_0} \cdot \dot{\delta} + \omega_R\right)} \quad \text{Equation 9}$$

$$G(\delta) = -\frac{\frac{V_R}{x_E} \cdot \sin(\delta)}{\left(\frac{\delta_0}{\omega_0} \cdot \dot{\delta} + \omega_R\right)} \cdot b(v_t, \delta)$$

having already defined $v_t$ in equation 5 and $\dot{v}_t$ in equation 3.

Equation 8 represents a system which, in fact (complete model) is, under normal operating conditions, locally stable though with oscillating phenomena; this assures that if the control generates an attractor on σ=0, then motion according to "sliding-modes" will be obtained even if $k^2$ meets the given specifications only around σ=0.

The surface selected for the compensator PSS is the following:

$$\sigma(t) = \left(\frac{d}{dt} + \lambda\right) \cdot \dot{\delta}, \lambda > 0, \text{ which yields} \quad \text{Equation 10}$$
$$\dot{\sigma}(t) = \frac{d^2\dot{\delta}}{dt^2} + \lambda \cdot \frac{d\dot{\delta}}{dt} = F(\delta) + G(\delta) \cdot v_{RIF} + \lambda \cdot \ddot{\delta}$$

The substitution of the control law in $v_{RIF}$ determines the following equation:

$$\dot{\sigma} = F(\delta) - G(\delta) \cdot k^2 \cdot \text{sign}(\sigma) \quad \text{Equation 11}$$

which, if k is chosen appropriately, yields:

$$\dot{\sigma} \leq -\eta \cdot \text{sign}(\sigma) \Rightarrow \frac{1}{2} \cdot \frac{d\sigma^2}{dt} \leq -\eta \cdot |\sigma|$$

which is the condition required by S.M.

In the present invention, the same principle is implemented, but making use of a particular description of state variables and, moreover, the control law is in a form that allows, at the designer's discretion, to obtain or not a dampening of the oscillations which are typical of this technique.

Since the measurements of network frequency are unlikely to be available, the following position:

$$\xi = \frac{P_E}{v_t} = \frac{V_R}{x_E} \cdot \sin(\delta) \quad \text{Equation 12}$$

allows to reach a similar form to the one obtained in Eqn. 8; in fact $$\dot{\xi} = \frac{V_R}{x_E} \cdot \cos(\delta) \cdot \delta_0 \cdot \dot{\delta} \quad \text{Equation 13}$$

which, in the normal operating range, is:

$$\dot{\xi} = \delta_0 \cdot \sqrt{1 - \left(\frac{x_E}{V_R} \cdot \xi\right)^2} \cdot \dot{\delta}$$

Equation 5 from which $\dot{\delta}$ is obtained.

Operating successive derivations and substitutions, the following equation system is reached:

$$\begin{cases} \frac{d\xi}{dt} = \dot{\xi} \\ \frac{d\dot{\xi}}{dt} = \ddot{\xi} \\ \frac{d\ddot{\xi}}{dt} = \Phi(\xi, \dot{\xi}, \ddot{\xi}) + \Gamma(\xi, \dot{\xi}, \ddot{\xi}) \cdot v_{RIF} \end{cases}$$

Equation 14 equivalently to the system 8.

If one selects in this case, too, a surface:

$$\sigma(t) = \left(\frac{d}{dt} + \lambda\right) \cdot \ddot{\xi}(t) \quad \text{we have, as before:}$$

Equation 15

$$\dot{\sigma}(t) = \frac{d\ddot{\xi}}{dt} + \lambda \cdot \ddot{\xi} = \Phi + \Gamma \cdot v_{RIF} + \lambda \cdot \ddot{\xi}$$

Obtaining the elimination of this surface and of its derivative, entails:

$$\frac{d\xi}{dt} = \dot{\xi}$$

Equation 16

$$\frac{d\dot{\xi}}{dt} = \sigma - \lambda \cdot \dot{\xi}$$

$$\frac{d\ddot{\xi}}{dt} = \dot{\sigma} \to 0$$

which, by definition of $\xi$, means also eliminating $d\delta/dt$ and $d^2\delta/dt^2$ as desired; in fact:

$$\dot{\xi} = 0 \Rightarrow \xi = \text{constant} = \frac{V_R}{x_E} \cdot \sin(\delta) \Rightarrow \delta = \text{constant}$$

Equation 17 in so far as, from the hypothesis made, $V_R$ and $x_E$ are constant.

Therefore, we have:

$\dot{\delta}$=0 and $\ddot{\delta}$=0  Equation 18 asymptotically, therefore, from equation 4, we have:

$P_M - P_E = 0$.

The realisation of the present invention requires a synthesis of a de facto estimated surface since the available measurements are not sufficient for its construction.

The techniques whereon the design of the invention is based are essentially aimed at estimating the sliding surface.

First of all, we observe that during the normal operation of an alternator, the angle $\delta$ is expected to be limited in a range between about $+/-\pi/6$ and the angular frequency of the machine always very close to the nominal value, it is possible further to simplify the initial equations:

$$\frac{d^2\delta}{dt^2} \approx \frac{P_M - P_E}{T_M}$$

Equation 19

$$P_E \approx \frac{V_R}{x_E} \cdot v_t \cdot \delta \quad \text{where}$$

$$-\delta_0 \leq \delta \leq \delta_o \text{ con } \delta_0 \approx \frac{\pi}{6} \text{ and } x'_E = \frac{x_E}{\sin(\delta_0)}$$

These positions allow to manipulate equations that are definitely simpler, without thereby losing in generality.

Therefore:

$$\delta = \frac{x'_E}{V_R} \cdot \xi, \quad \dot{\delta} = \frac{x'_E}{V_R} \cdot \dot{\xi} \quad \text{etc.}$$

Equation 20

$$20.1) \quad \frac{d^2\xi}{dt^2} = \frac{P_M - \frac{x'_E}{V_R} \cdot \xi \cdot v_t}{\frac{x'_E}{V_R} \cdot T_M}$$

from which $v_t$. By differentiating we obtain $$\frac{d^3\xi}{dt^3} = -\frac{\dot{\xi} \cdot v_t + \xi \cdot \dot{v}_t}{T_M}$$

20.2)

having assumed $\dot{P}_M \approx 0$ and, finally $$\frac{d^3\xi}{dt^3} = -\frac{\dot{\xi} \cdot \left(P_M - \frac{x'_E}{V_R} \cdot \ddot{\xi}\right)}{T_M \cdot \frac{x'_E}{V_R} \cdot \xi} - \frac{\xi \cdot \dot{v}}{T_M}$$

20.3)

Now remembering the equation of the machine voltage (Equation 3) and replacing in 20.3:

$$\frac{d^3\xi}{dt^3} = -\frac{\dot{\xi} \cdot \left(P_M - \frac{x'_E}{V_R} \cdot \ddot{\xi}\right) + \frac{x'_E}{V_R} \cdot \xi^2 \cdot a(\xi)}{T_M \cdot \frac{x'_E}{V_R} \cdot \xi} -$$

Equation 21

$$\frac{\xi \cdot b}{T_M} \cdot v_{RIF}$$

in which b>0.

As is readily apparent, since all quantities are uncertain ($V_R$, $x'_E$, $T_M$, etc) in the so-called "drift" term (i.e. the first term at second member of the equation), the transformation of variables made allows to apply the "sliding modes" technique which is practically insensitive to the variation and/or uncertain of these parameters.

The synthesis of the sliding surface requires to estimate two system states: the first and second derivative of the variable $\xi$.

Figure 2:
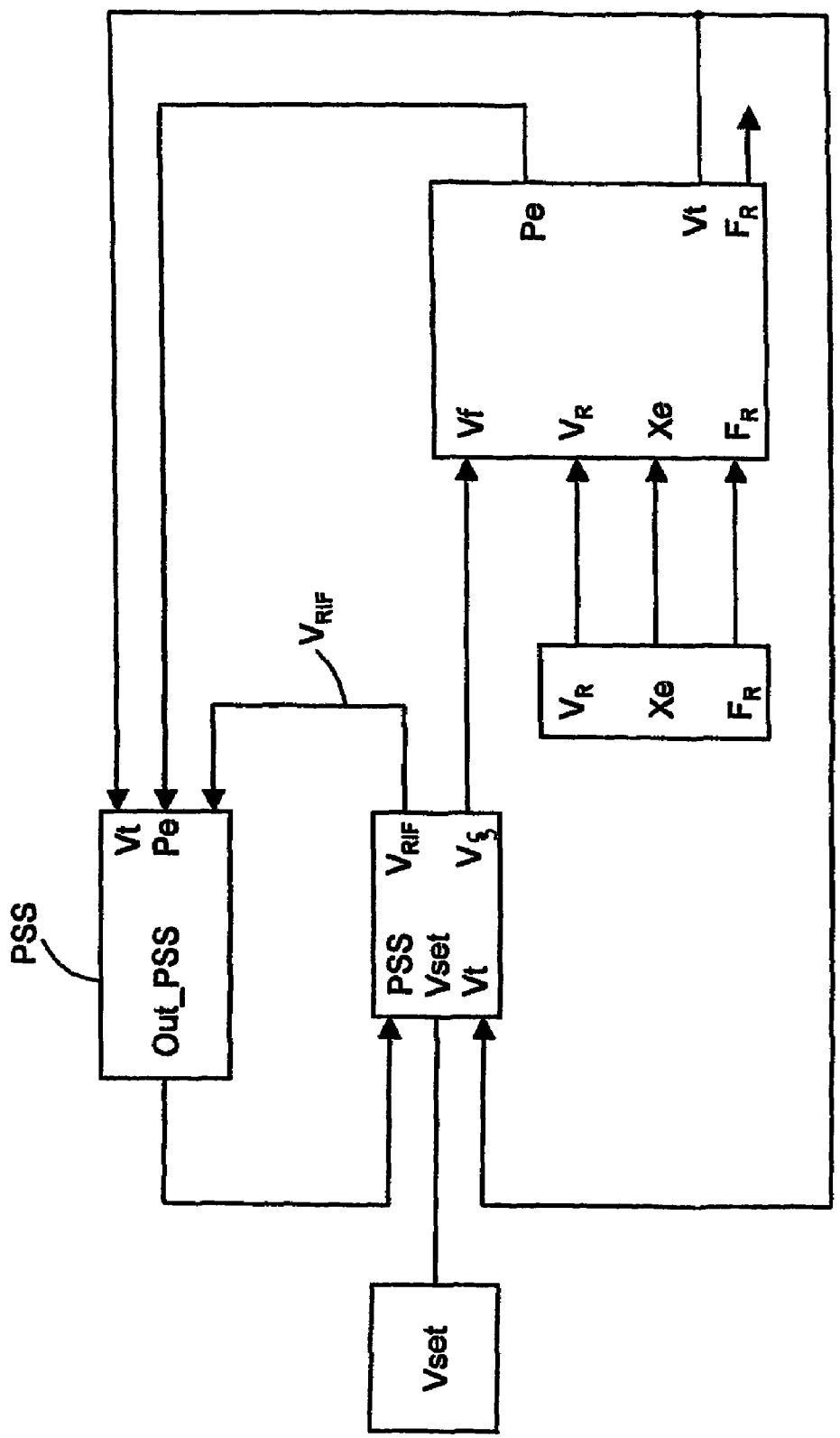
FIG. 2 shows, by means of function blocks, the flow of the electrical signals in said plant.

FIG. 2 schematically shows the plant 100 highlighting the implemented regulation architecture.

Some of the blocks shown in FIG. 2 represent components shown in FIG. 1 and, therefore, they were designated with the same symbolic reference. The block designated with the symbol GEN & NET schematically represents the alternator G and the network NET defined above. The block designated as PAR represents the parameters of the network NET (network voltage $V_R$, external reactance Xe, and grid frequency $F_R$). FIG. 2 also highlights the flow of the signals between the various blocks and it is in accordance with what is described with reference to FIG. 1 and with what is expressed in the analysis set out above.

Figure 3:
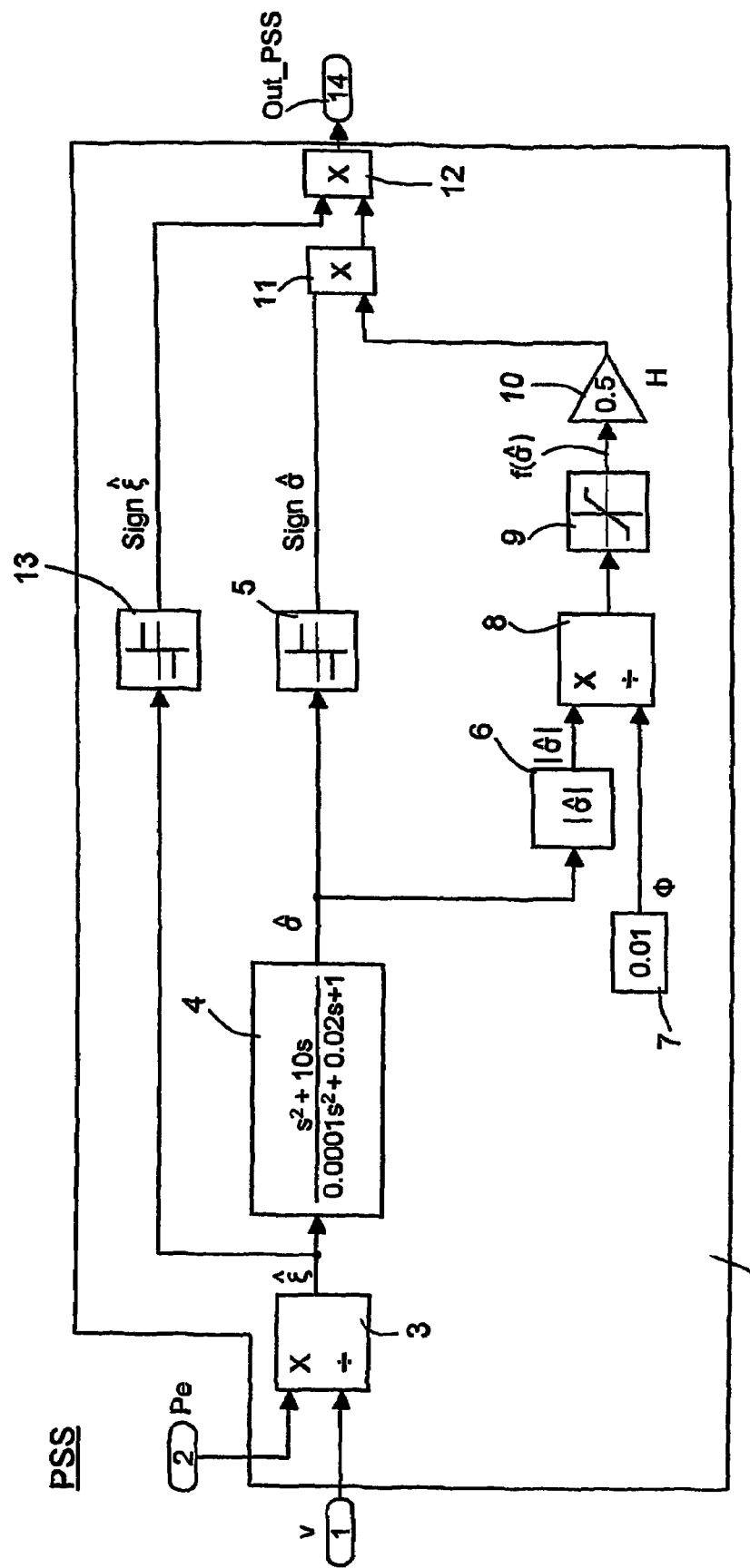

FIG. 3 shows a particular embodiment of a stabiliser device PSS according to the invention and usable in the plant 100 of FIG. 1. Preferably, the stabiliser device PSS is embodied as a modular element by means of analogue and/or digital components housed on a board 15; in particular, the stabiliser device PSS can be selectively coupled to and removable from the voltage regulator AVR and is thus interchangeable to be replaced, for instance in case of failure or for upgrading operations.

According to this first embodiment, a second order deriving filter is used.

The stabiliser device PSS is provided with a first 1 and a second 2 input terminal for its main input signal which, according to said example, are active electrical power $P_E$ and machine voltage $v_t$.

The stabiliser device PSS implements the following equations:

$$\hat{\sigma}(t) = \left(\frac{d}{dt} + \lambda\right) \cdot \dot{\hat{\xi}}(t)$$

$$\text{Out\_PSS} = H \cdot \text{sign}(\xi) \cdot f(\hat{\sigma}) \cdot \text{sign}(\hat{\sigma})$$

Equations 22

The equations 22 are similar to the equations 15 and to the first of the equations 7. In particular, the symbol "^" indicates that the corresponding quantities are obtained by estimation. Moreover, it should be recalled that the estimated quantity $\hat{\xi}$ is expressed in accordance with the equation 12.

In the second of the equations 22, note that the gain H has the sign of $\xi$ to guarantee the sliding modes condition and $f(\sigma)$ is any suitable function.

For example, for the sliding modes approximation the function $f(\sigma)$ is:

$$f=1, \ |\sigma|/\Phi>1; f=|\sigma|, \ |\sigma|/\Phi<1.$$

A function of this kind is indicated by the aforementioned text by Slotine, "Applied Nonlinear Control" and it is such as to allow advantageously to dampen "chattering".

Returning to FIG. 3, the input terminals 1 and 2 are connected to a divider block 3 which is such as to divide the signal $P_E$ and $v_t$ and to obtain the estimate of the variable $\xi(t)$ in accordance with the equation 12.

One output of the divider block 3 is connected to first processing means 4 which conduct a processing operation to provide an electrical signal indicating an estimate of the sliding surface $\sigma(t)$.

According to the first embodiment of the invention, the first processing means 4 include a second order filter able to conduct a processing operation in accordance with the first expression of equation 22 which includes an operation of computing the first derivative of $\xi(t)$ and the second derivative of the same variable $\xi(t)$.

FIG. 3 shows, purely by way of example, a possible transfer function of the second order filter 4. In particular, the filter 4 can be implemented by an analogue or digital high pass filter.

An output OUT of the second order filter 4 is connected to a processing block 5 such as to evaluate the sign of $\sigma(t)$.

Moreover, the output OUT is connected to a processing branch including a plurality of blocks 6-10.

The block 6 is such as to evaluate the absolute value of the signal indicative of the sliding surface $\sigma(t)$ and is connected to an additional divider block 8 such as to effect the ratio between the output signal of the block 6 and the parameter $\Phi$ introduced above (block 7), set according to the example to the value 0.01.

The divider block 8 is connected to a saturation block 9 which saturates to 1 the ratio $\sigma(t)/\Phi$.

The output of the saturation block 9 is connected to a gain block 10 which introduces the aforementioned gain H, for instance, set to the value 0.5.

The output of the gain block 10 and the output of the block 5 are connected to a first multiplier 11 having an output which in turn is connected to a second multiplier 12.

The second multiplier 12 is such as to receive at its input also a signal corresponding to the sign of the estimate of the quantity $\xi(t)$ made available by a block 13 connected to the output of the divider block 3.

Moreover, said second multiplier 12 allows to multiply the signal $\text{sign}(\hat{\xi}(t))$ with the signal $H f(\sigma(t)) \text{sign}(\sigma(t))$ output by the first multiplier block 11 and to generate the output signal OUT_PSS present on the output terminal 14.

In the operation of the compensator device PSS, based on the signal indicative of the active power $P_E$ and of the one for machine voltage $v_t$, the sliding surface $\sigma(t)$, of the second order sliding modes type, is estimated by the block 3 and by the filter 4. Moreover, the block 13 evaluates the sign of the ration $P_E/v_t$, i.e. the sign of the quantity $\xi(t)$ that constitutes the variable to be controlled.

Starting from the signal corresponding to this estimated sliding surface $\sigma(t)$ the function $f(\sigma(t))$ is built (block 6-9) and the sign of the signal corresponding to said surface is evaluated.

Through a first multiplication in the first multiplier block 11 and a subsequent multiplication in the multiplier block 12, the signal OUT_PSS is built.

This signal OUT_PSS, supplied to the summing node ND of the exciter 200 of FIG. 1, will contribute to the formation of the voltage reference signal $V_{RIF}$ which is inserted in the voltage regulator AVR. The action of the voltage regulator ACR and of the actuating device ACT operatively associated with the field windings CL-F causes an intervention on the operation of the alternator G.

In this way the measuring signals $P_E$ and $v_t$ will be modified causing the amplitude of the signal $\xi(t)$ obtained in the stabiliser PSS to be maintained substantially constant (i.e. the first derivative of $\xi(t)$ is substantially equal to zero) and the signal $\sigma(t)$ to be brought substantially to converge to zero.

This allows to stabilise the unit 50 damping its electromechanical oscillations.

According to a different version of the embodiment of FIG. 3, the stabiliser PSS is also supplied with a signal indicative of the required active power $P_{RIF}$ and a signal indicative of the required machine voltage $V_{SET}$.

In this case, the sliding surface $\sigma(t)$ will contain an additional term which will be directly constituted by the variable, $\xi(t)=\xi_1(t)=P_E/v_t$, i.e.:

$$\sigma(t) = \left(\frac{d}{dt} + \lambda\right)^2 \cdot [\xi(t) - \xi_{RIF}(t)] \quad \text{Equation 23}$$

in which $\xi_{RIF}(t) = P_{RIF}/V_{SET}$ and $P_{RIF}$ and $V_{SET}$ are, respectively, the reference values of active power and machine voltage desired at steady state.

This last assumption allows to have an easily computed surface:

$$\sigma(t) = \left(\frac{d}{dt} + \lambda\right)^2 \cdot [\xi(t) - \xi_{RIF}(t)] \quad \text{Equation 24}$$
$$= \frac{d^2 \xi(t)}{dt^2} + 2 \cdot \lambda \cdot \frac{d\xi(t)}{dt} + \lambda^2 \cdot [\xi(t) - \xi_{RIF}(t)]$$

The rest of the control is similar to the one described in FIG. 3.

Figure 4:
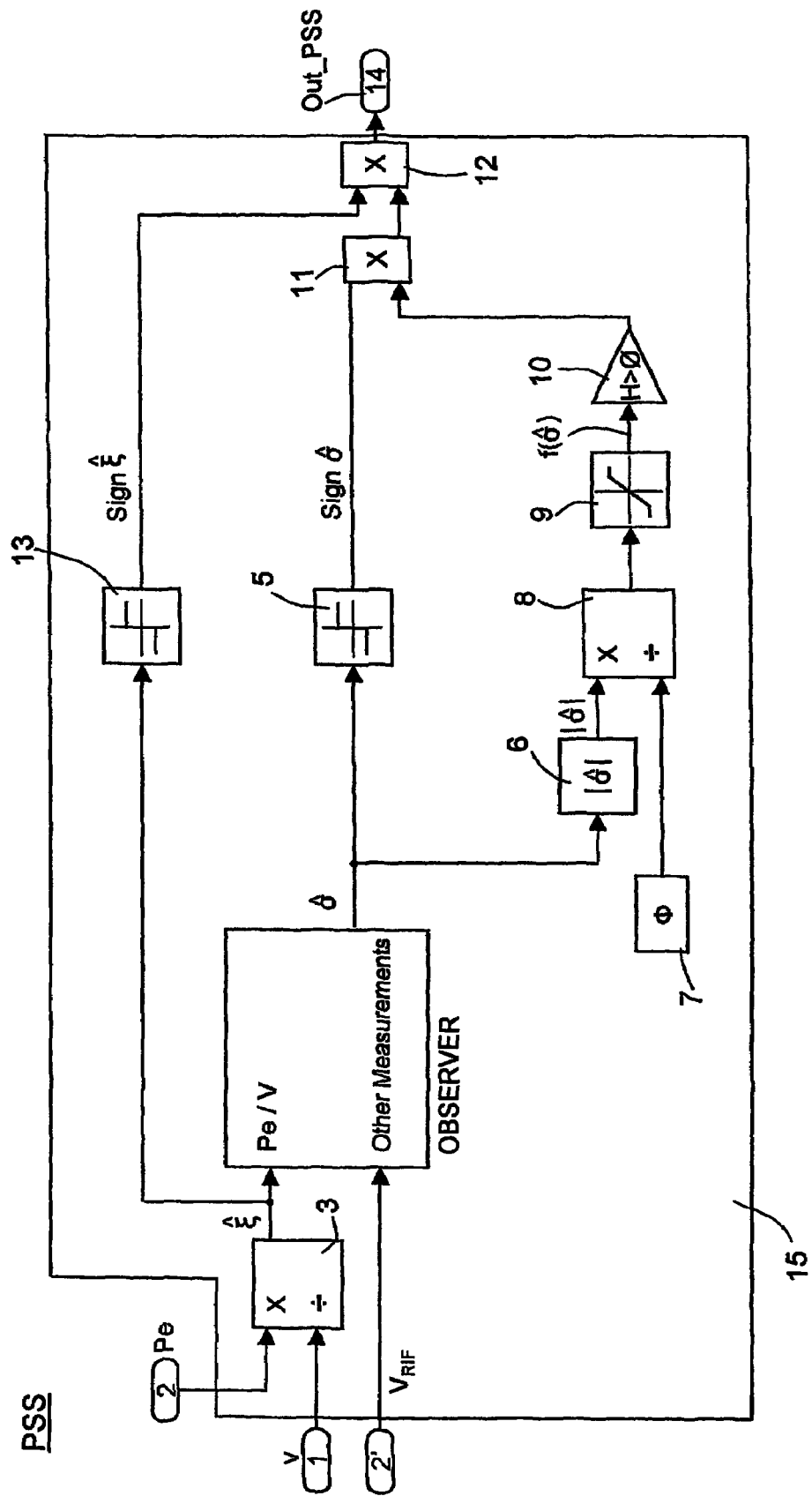

FIG. 4 shows a second embodiment of a PSS compensator in accordance with the present invention. According to the embodiment of FIG. 4, the processing of the measurement signals for estimating the sliding surface σ(t) is performed not with a second order filter but with a linear or non linear observer 4'. Moreover, it should be noted that the observer 4' can be obtained with a sliding modes technique (sliding observers).

In the diagram of FIG. 4, the same numerical references of FIG. 3 are used to designate identical or similar components.

The observer 4' is connected to the output of the divider block 3 to receive the signal $P_E/v_t$ and to a third input terminal 2' to receive at least another signal.

For example, the third terminal is provided with the voltage reference electrical signal $v_{RIF}$ which is also sent to the voltage regulator AVR shown in FIG. 1. Note that the fact that to the compensator PSS is sent the reference signal of $v_{RIF}$ is also indicated in the diagram of FIG. 2.

The synthesis of a non linear observer exemplifier can easily be made by a person skilled in the art, based on the following expression:

$$\begin{cases} \xi = \xi_1 \\ \dot{\hat{\xi}}_1 = \hat{\xi}_2 + g_1 \cdot (\xi - \hat{\xi}_1) \\ \dot{\hat{\xi}}_2 = \hat{\xi}_3 + g_2 \cdot (\xi - \hat{\xi}_1) \\ \dot{\hat{\xi}}_3 = -\frac{[\hat{\xi}_2 + \xi_1 \cdot a(\xi)] \cdot v_t + \xi_1 \cdot b \cdot v_{RIF}}{T_M} + g_3 \cdot (\xi - \hat{\xi}_1) \end{cases} \quad \text{Equation 25}$$

which, once $g_1$, $g_2$ e $g_3$, are properly selected, will allow to eliminate the observation error and will provide an estimate of the unmeasured states.

Moreover, it should be noted that the stabiliser PSS can be obtained, according to a variant of the invention, employing instead of the filter 4 or of the observer 4' a Levant differentiator, i.e. a device also known as "super-twisting 2-Sliding modes differentiator".

FIG. 5 shows a compensator PSS according to a third embodiment of the invention, in which control is based on the measurement of rotor velocity ω. This embodiment is particularly advantageous because the measurement of rotor velocity ω is commonly available in the velocity regulators of turbo-machines and hence can be easily acquired in rapid and precise fashion.

In this case, one starts from the equations in δ:

$$\frac{d\delta}{dt} = \omega - \omega_R = \dot{\delta}(t) \quad \text{Equation 26}$$

$$\frac{d\dot{\delta}}{dt} = \frac{C_m - C_e}{J} \quad \text{con}$$

$$C_e = \frac{v_R}{x_e} \cdot (\psi_q \cdot \cos\delta + \psi_d \cdot \sin\delta)$$

$$\frac{d^2\dot{\delta}}{dt^2} = \frac{\dot{C}_m - \frac{v_R}{x_e} \cdot \left[\begin{array}{c}(\psi_d \cdot \cos\delta - \psi_q \cdot \sin\delta) \cdot \dot{\delta} + \\ \frac{d\psi_d}{dt} \cdot \sin\delta + \frac{d\psi_q}{dt} \cdot \cos\delta \end{array}\right]}{J}$$

where, as always, δ is the angle between axis q and the network voltage vector, having amplitude $V_R$, ω is the angular velocity of the reference system integral with axis q (i.e. rotor velocity), $\omega_R$ is electrical network frequency, and lastly $C_m$ and $C_e$ designate the motive torque and the electrical torque, respectively. Moreover, $\psi_d$ and $\psi_q$ are the direct axis flow, and the quadrature axis flow, respectively, and they are defined as follows:

$$\frac{d\psi_d}{dt} = -\frac{1}{T'_{d0}} \cdot \psi_d + \frac{1}{T'_{d0}} \cdot v_f - \frac{x_d}{T'_{d0}} \cdot i_d - x'_d \cdot \frac{di_d}{dt} \quad \text{Equation 27}$$

$$\frac{d\psi_q}{dt} = -\frac{1}{T'_{q0}} \cdot \psi_q + \frac{x_q}{T'_{q0}} \cdot i_q - x'_q \cdot \frac{di_q}{dt}$$

$$i_d = \frac{\omega \cdot \psi_d - v_R \cdot \cos\delta}{x_e}$$

$$i_q = \frac{v_R \cdot \sin\delta + \omega \cdot \psi_q}{x_e}$$

where $i_d$ is the current associated with the axis d, $i_q$ is the current associated with the axis q, $x_e$, $x_d$, $x'_d$, $x_q$, $x'_q$ are, respectively, the external reactance, synchronous direct axis reactance, transient direct axis reactance, synchronous quadrature reactance and transient quadrature reactance, $T'_{d0}$, $T'_{q0}$ the load-less direct axis and quadrature time constants and $v_f$ is field voltage, which represents the control variable.

The equations 26 can be manipulated so as to express the field voltage $v_f$ and to identify the possibility of obtaining the convergence to zero of the selected sliding surface. For this purpose, some simplifying hypothesis are made, which leave the generality of the approach unchanged and are commonly verified.

In the first place, under normal operating conditions rotor frequency ω is about equal to network frequency $\omega_R$. Moreover, the disturbance represented by mechanical torque can be considered constant. The first and the third of the equations 26 therefore assume the following form:

$$\dot{\delta} = \omega - \omega_R \approx 0 \quad \text{Equation 28}$$

$$\frac{d^2\delta}{dt^2} = \frac{-\frac{v_R}{x_e} \cdot \left(\frac{d\psi_d}{dt} \cdot \sin\delta + \frac{d\psi_q}{dt} \cdot \cos\delta\right)}{J}$$

The quadrature flux $\psi_q$ relating to the axis q is represented by a differential equation of relative order zero which can be replaced, with an acceptable approximation, by an algebraic equation in sin δ. Therefore, the time derivative of the quadrature flux $\psi_q$ is proportional $d\delta/dt$ which, as shown by the first of the equations 28, is about nil.

Consequently, the following apply:

$$\frac{d^2\delta}{dt^2} \approx \frac{-\frac{v_R}{x_e} \cdot \left(\frac{d\psi_d}{dt} \cdot \sin\delta + \frac{d\psi_q}{dt} \cdot \cos\delta\right)}{J} \quad \text{Equation 29}$$

$$\frac{d\psi_d}{dt} = -\frac{x_e + x_d \cdot \omega + x'_d \cdot T'_{d0} \cdot \frac{d\delta}{dt}}{(x_e + x'_d \cdot \omega) \cdot T'_{d0}} \cdot \psi_d +$$
$$\frac{x_e}{(x_e + x'_d \cdot \omega) \cdot T'_{d0}} \cdot v_f +$$
$$\frac{x_d}{(x_e + x'_d \cdot \omega) \cdot T'_{d0}} \cdot v_R \cdot \cos\delta$$

$$\psi_q \approx -\frac{x_q}{(x_e + x_q \cdot \omega)} \cdot v_R \cdot \sin\delta \quad \text{and}$$

$$\frac{d\psi_q}{dt} \approx \frac{x_q^2}{(x_e + x_q \cdot \omega)} \cdot v_R \cdot \sin\delta \cdot \frac{d\delta}{dt}.$$

At this point we can derive an expression of the direct axis flux $\psi_d$ recalling that:

$$\frac{d\delta}{dt} = \frac{C_m - C_e}{J} \quad \text{Equation 30}$$
$$= \frac{C_m - \frac{v_R}{x_e} \cdot (\psi_q \cdot \cos\delta + \psi_d \cdot \sin\delta)}{J} =$$
$$= \frac{C_m - \frac{v_R}{x_e} \cdot \left(\psi_d - \frac{x_q}{(x_e + x_q \cdot \omega)} \cdot v_R \cdot \cos\delta\right) \cdot \sin\delta}{J}$$

wherefrom the following is derived $$\psi_d = \frac{x_e \cdot (x_e + x_q \cdot \omega) \cdot \left(C_m - J \cdot \frac{d\delta}{dt}\right) + v_R^2 \cdot x_q \cdot \sin\delta \cdot \cos\delta}{v_R \cdot (x_e + x_q \cdot \omega) \cdot \sin\delta}$$

Therefore, the direct axis flux $\psi_d$, the quadrature flux $\psi_q$ and the derivative of the quadrature flux $\psi_q$ are functions of the angle $\delta$, whereas the derivative of the direct axis flux $\psi_d$ is a function both of the angle $\delta$, and of the field voltage $v_f$, i.e.:

$$\psi_d = \psi_d(\delta) \quad \text{Equation 31}$$
$$\psi_q = \psi_q(\delta)$$
$$\frac{d\psi_d}{dt} = a_d(\delta) + b_d \cdot v_f$$
$$\frac{d\psi_q}{dt} = a_q(\delta)$$

Replacing in the Equation 29, the following is obtained:

$$\frac{d^2\delta}{dt^2} \approx \frac{-\frac{v_R}{x_e} \cdot \begin{pmatrix} a_d(\delta) \cdot \sin\delta + a_q(\delta) \cdot \\ \cos\delta + b_d \cdot \sin\delta \cdot v_f \end{pmatrix}}{J} \quad \text{Equation 32}$$
$$= F(\delta) + g(\delta) \cdot v_f$$

with $$F(\delta) = -\frac{v_R}{x_e} \cdot \frac{a_d(\delta) \cdot \sin\delta + a_q(\delta) \cdot \cos\delta}{J}$$

$$g(\delta) = -\frac{v_R}{x_e} \cdot \frac{b_d \cdot \sin\delta}{J}$$

In normal operating conditions, the drift term $F(\delta)$ is a limited quantity and $g(\delta)$ has negative sign for $0<\delta<\pi/6$ (i.e. still in normal operating conditions). Consequently, the conditions for the sliding motions exist.

A sliding surface and the relative control law (expression of the field voltage) are given by the following:

$$\sigma = \lambda \cdot \frac{d\delta}{dt} \approx \lambda \cdot \dot\omega \quad \text{Equation 33}$$

$$v_f = k^2 \cdot \text{sign}(\dot\omega) \quad (\text{since } g(\delta) < 0)$$

with the usual meanings of the symbols.

The type of control described, based on rotor velocity $\omega$ (or, more precisely, on its derivative $\dot\omega$) is accomplished by the compensator PSS of FIG. 5. In detail, in the third embodiment, the compensator PSS has an input terminal 20 connected to the measurement acquisition and processing module ACQ-M to receive the rotor velocity $\omega$. A differentiator block 21 receive the rotor velocity $\omega$ through the first terminal 20, determines the derivative $\dot\omega$ of the rotor velocity $\omega$ and supplies it to a gain block 22, arranged immediately downstream, which operates a multiplication times the factor $\lambda$. In practice, the differentiator block 21 and the gain block 22 together calculate the sliding surface $\sigma$ based on equation 33. The sliding surface $\sigma$ is supplied to a processing branch 24 which includes a divider block 25, an absolute value extractor block 26, a saturation block 27 and a multiplier block 28, mutually connected in cascade in the above order. In particular, a first input and a second input of the divider block 25 receive the sliding surface $\sigma$ and, respectively, a parameter $\Phi$ which lies within a predetermined range. On the output of the divider block is therefore present the value $\sigma/\Phi$, the module $|\sigma/\Phi|$ whereof, possibly limited by the saturation block 27, is calculated by the absolute value extractor block 26. The multiplier block 28, lastly, multiples the value provided by the saturation block 27 for a positive gain $H^2$. An additional multiplier block 30 has a first input connected to the output of the multiplier block 28 and a second input connected to the output of the deriving block 21, through a sign recogniser block 31, which determines the sign of the sliding surface. The output of the multiplier block 30 forms the output terminal of the compensator PSS and provides the output signal OUT_PSS in accordance with the equations 33.

Alternatively, the derivative of the rotor velocity $\omega$ can be determined using a second order sliding modes observer ("super-twisting 2-Sliding modes differentiator" o Levant differentiator).

According to a fourth embodiment of the invention, the PSS compensator uses an estimate of the derivative of the angle δ, which is provided by the following:

$$\hat{\dot{\delta}} = \omega - A \cdot \hat{\delta} \qquad \text{Equation 34}$$

where A is a constant parameter. In this case, the corresponding sliding surface σ is:

$$\sigma(t) = \left(\frac{d}{dt} + \lambda\right) \cdot \hat{\delta} \qquad \text{Equation 35}$$

If rotor velocity ω us constant, the estimate $$\hat{\delta}$$

tends to zero at a rate that depends on the parameter. It has already been shown that, if the control law is such as to reduce to zero the sliding surface σ and its derivative, the following applies:

$$\frac{d^2\delta}{dt^2} = \dot{\sigma} - \lambda \cdot \frac{d\delta}{dt} \qquad \text{Equation 36}$$

Moreover, the system is autonomous and asymptotically stable. When, instead of the derivative $\dot{\delta}$, its estimate $$\hat{\dot{\delta}}$$

is used, we have:

$$\frac{d^2\delta}{dt^2} = \dot{\sigma} - (\lambda - A) \cdot \frac{d\delta}{dt} + (\lambda - A^2) \cdot \hat{\delta} \qquad \text{Equation 37}$$

from which it may be deduced that it necessary to choose 0<A<λ.

The control described above is implemented by the compensator PSS of FIG. 6, which comprises the processing branch 24, the multiplier block 30 and the sign recogniser block 31, already described with reference to FIG. 5, and further includes an input terminal 40, a subtractor node 41, an integrator block 42, a gain block 43 and a processing block 44. In detail, the subtractor node 41 has a first input connected to the input terminal 40, which receives the measurement of the rotor velocity ω from the measurement acquisition and processing module ACQ-M, and a second input connected to the output of the gain block 43. The integrator block 42 has an input and an output, respectively connected to the output of the subtractor node 41 and to the input of the gain block 43, so as to form a loop. In practice, the estimate $$\hat{\dot{\delta}}$$

of the derivative $\dot{\delta}$ of the angle δ is provided on the output of the subtractor node 41, and is used by the processing block 44 to compute the sliding surface σ in accordance with equation 35. The sliding surface σ is then processed by the processing branch 24 and by the multiplier block 30 as described above with reference to FIG. 5.

A fifth embodiment of the invention provides for the use of the active electrical power $P_E$, which, like rotor velocity ω, is easy to measure and is normally available in electrical power production plants. The approach described below can be advantageously exploited under some simplifying hypotheses, which are generally verified. In particular, it is assumed that the network parameters, with the exception of the load angle δ, are constant or slowly variable and that the active power $P_E$ depends on machine voltage $v_f$, on network voltage $V_R$ and on the angle δ. Consequently, the active power $P_E$ is also a function of the direct axis flux $\psi_d$, which in turn has a first order dependence on the field voltage $v_f$. In fact, the active power $P_E$ is also correlated to the quadrature flux $\psi_q$, which can, however, be expressed in terms of the angle δ. Therefore, we have, in practice:

$$P_E = P_E(\delta, \psi_d) \qquad \text{Equation 38}$$

Lastly, it is assumed that the following relationships apply:

$$\dot{\delta} \approx 0 \qquad \text{Equation 39}$$

$$\ddot{\delta} \approx \frac{P_M - P_E}{J \cdot \omega_0}$$

The sliding surface σ can be of the general type described by the following:

$$\sigma = \lambda \cdot \dot{P}_E \qquad \text{Equation 40}$$

which, taking into account the equations 38 and 39, entails:

$$\frac{d\sigma}{dt} = \lambda \cdot \frac{d}{dt}\left[\frac{\partial P_E}{\partial \delta} \cdot \dot{\delta} + \frac{\partial P_E}{\partial \psi_d} \cdot \dot{\psi}_d\right] =$$

$$= \lambda \cdot \left[\frac{\partial^2 P_E}{\partial \delta^2} \cdot \dot{\delta}^2 + \frac{\partial P_E}{\partial \delta} \cdot \ddot{\delta} + \frac{\partial^2 P_E}{\partial \psi_d^2} \cdot \dot{\psi}_d^2 + \frac{\partial P_E}{\partial \psi_d} \cdot \ddot{\psi}_d\right]$$

and:

$$\frac{d\sigma}{dt} = \lambda \cdot \left(\frac{\partial P_E}{\partial \delta} \cdot \frac{P_M - P_E}{J \cdot \omega_0} + \frac{\partial^2 P_E}{\partial \psi_d^2} \cdot \left(\frac{\dot{P}_E}{\frac{\partial P_E}{\partial \psi_d}}\right)^2 + \frac{\partial P_E}{\partial \psi_d} \cdot \ddot{\psi}_d\right) \qquad \text{Equation 41}$$

The control has a 1$^{st}$ order dependence on the direct axis flux $\psi_d$; therefore, the control law, which is represented herein again by the field voltage $v_f$, is of the type:

$$v_f = \int_t -k^2 \cdot \text{sign}(\sigma) \cdot d\tau \qquad \text{Equation 42}$$

The control term is therefore the following:

$$\frac{dv_f}{dt} = -k^2 \cdot \text{sign}(\sigma) \qquad \text{Equation 43}$$

The control described herein is implemented by the compensator PSS of FIG. 7, the structure whereof is similar to the device shown in FIG. 5. In particular, the compensator PSS in accordance with the fifth form of embodiment of the invention comprises the differentiator block 21, the gain block 22, the processing branch 24, the multiplier block 30 and the sign recogniser block 31. An input terminal 50 is connected to the measurement acquisition and processing module ACQ-M, to receive the measurement of the active power $P_E$. Moreover, an integrator 51 and a saturation block 52, which provides the output signal OUT_PSS, are connected downstream of the multiplier block 30. In practice, the differentiator block 21 and the gain block 22 determine the sliding surface σ on the basis of the equation 40 and feed it to the processing branch 24 and to the sign recogniser block 31. In accordance with the equation 43, therefore, on the output of the multiplier block 30 there is present the value $$\frac{dv_f}{dt} = -k^2 \cdot \text{sign}(\sigma),$$

wherein the sliding surface σ is the one calculated by the deriving block 21 and by the gain block 22. Lastly, the integrator block 51 calculates the field voltage $v_f$ to be provided at the output and the saturation block 52 limits the extent of the control, if a pre-determined threshold is exceeded.

According to a sixth embodiment of the invention, whereto FIG. 8 refers, the compensator PSS uses an estimate of the derivative of the active power $P_E$. For this purpose, a second order filter is used which allows to construct a suitable sliding surface σ, with no need to perform derivatives of the measurements and to integrate the control signal. In particular, the sliding, surface a is given by the following:

$$\sigma = \left(\frac{d}{dt} + \lambda\right) \cdot \frac{d\hat{P}_E}{dt} \qquad \text{Equation 44}$$

where the estimate $$\frac{d\hat{P}_E}{dt}$$

of the derivative of the active power $P_E$ is calculated by means of a second order filter 60 (see FIG. 8) which uses the following:

$$\frac{d^2 \hat{P}_E}{dt^2} = b(P_E - \hat{P}_E) - a\frac{d\hat{P}_E}{dt} \qquad \text{Equation 45}$$

In particular, the parameters a and b of the filter are chosen in such a way that the estimate error $\hat{e} = P_E - \hat{P}_E$ asymptotically tends to zero, i.e.:

$$\lim_{t \to \infty}(P_E - \hat{P}_E) = 0 \qquad \text{Equation 46}$$

If the parameters a and b of the filter allow to meet this condition, it is possible to construct a discontinuous and canonical first order control directly on the field voltage $v_f$ (instead of on its derivative).

As shown in FIG. 8, in this embodiment of the invention, the filter 60 replaces the differentiator block 21 and the gain block 22 of FIG. 7. Moreover, the integrator block 51 and the saturation block 52 are missing: in this case, the control variable, i.e. the field voltage $v_f$, is provided directly by the multiplier block 30.

Figure 9:
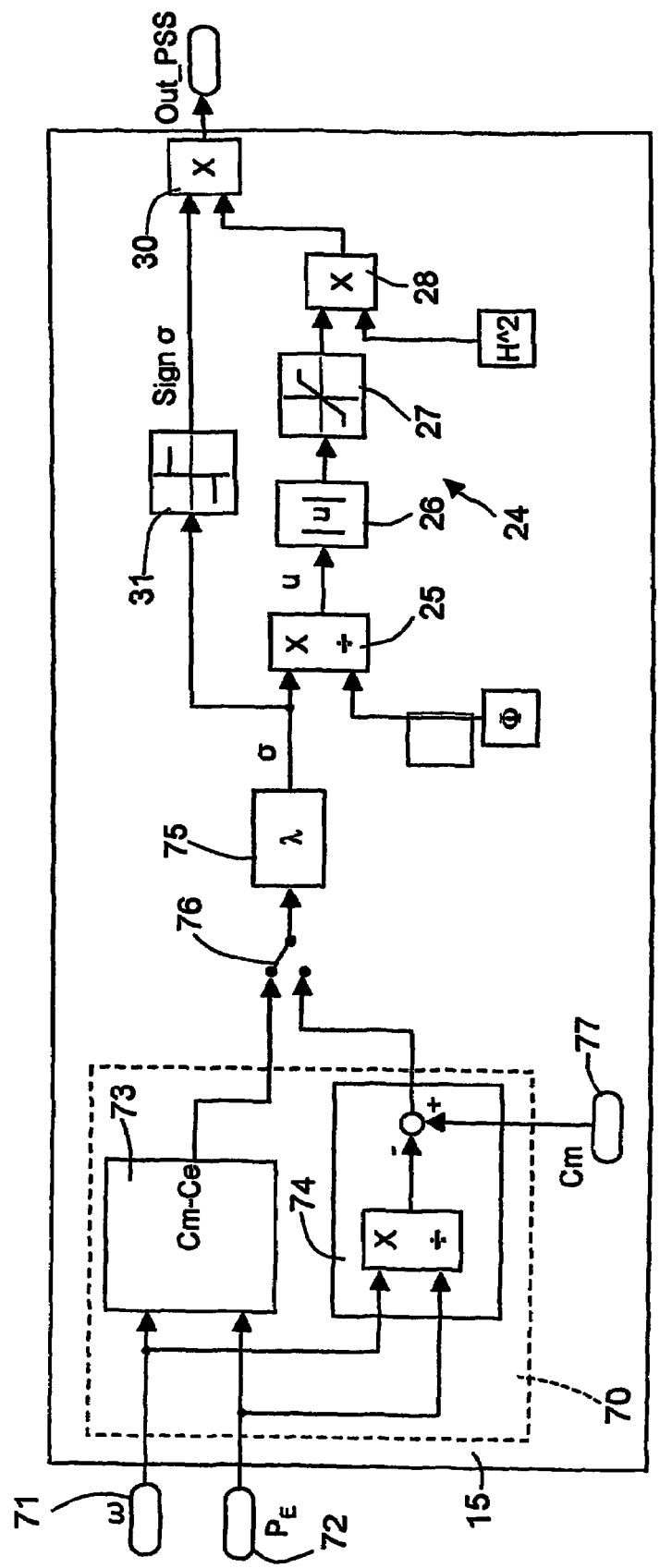

FIG. 9 shows a seventh embodiment of the invention, whereby the compensator PSS uses, in addition to the active power $P_E$, also an estimate or a measurement of mechanical power $P_M$ or, alternatively, an estimate or a measurement of the mechanical torque $C_M$. The compensator PSS of FIG. 9 comprises, as in the previous cases, the processing branch 24, the multiplier block 30 and the sign recogniser block 31. Moreover, upstream of the processing branch 24 is positioned a module 70 for calculating the sliding surface σ, which has a first and a second input terminal 71, 72 connected to the measurement acquisition and processing module ACQ-M, to receive the rotor velocity ω and the active power $P_E$. In detail, the module 70 comprises an observer 73, a calculation block 74, a multiplier 75 and a selector 76.

The observer 73 provides an estimate of the balance between the electrical torque $C_E$ and the mechanical torque $C_M$, based on the rotor velocity ω and on the active power $P_E$. The calculation block 74 has an additional input 77 connected to the measurement acquisition and processing module ACQ-M, to receive the measurement of the mechanical torque $C_M$ and, still based on the rotor velocity ω and on the active power $P_E$, it calculates the balance between the measurements of the electrical torque $C_E$ and of the mechanical torque $C_M$.

The selector 76 alternatively connects the outputs of the observer 73 and of the calculation block 74 to the multiplier block 75, which multiplies the quantity received at its input times the parameter λ.

Preferably, the observer 76 is in turn provided with a sliding modes control and it estimates the mechanical power $P_M$ as if it were a constant (the hypothesis is realistic, since the mechanical power $P_M$ is slowly variable).

Starting from the equation of motion $$\frac{d\omega}{dt} = \frac{C_M - C_E}{J} \qquad \text{Equation 47}$$

the observer 73 is constructed as follows:

$$\frac{d\hat{\omega}}{dt} = \frac{\hat{C}_M - C_E}{J'} + G \cdot e \quad \text{Equation 48}$$

in which the moment of inertia J' is unknown, the electrical torque $C_E$ is measured, G is the observer gain and $e \approx \omega - \hat{\omega}$ is the error of the observer 73.

The sliding surface $\sigma_{OSS}$ of the observer is given by the following:

$$\sigma_{OSS} = \left(\frac{d}{dt} + \lambda_{OSS}\right) e \quad \text{Equation 49}$$

whereas the control law of the observer is given by the $$\frac{d\hat{C}_M}{dt} = k^2 \cdot \text{sign}(\sigma) \quad \text{Equation 50}$$

The error of the observer tends to zero, as will be shown, and therefore the difference between the real torque balance and the estimated torque balance tends to be reduced to zero, thus asymptotically one has:

$$\frac{\hat{C}_M - C_E}{J'} = \frac{C_M - C_E}{J} \quad \text{Equation 51}$$

Starting from the estimate error, we have:

$$\dot{e} = \dot{\omega} - \dot{\hat{\omega}} = \frac{C_M - C_E}{J} - \frac{\hat{C}_M - C_E}{J'} - g \cdot e \quad \text{Equation 52}$$

from which:

$$\ddot{e} = \frac{\dot{C}_M}{J} - \frac{\dot{\hat{C}}_M}{J} - \left(\frac{1}{J} - \frac{1}{J'}\right) \cdot \dot{C}_E - g \cdot \dot{e} \quad \text{Equation 53}$$

and, replacing the equation 50 in the equation 53:

$$\begin{aligned}\ddot{e} &= \frac{\dot{C}_M}{J} - \left(\frac{1}{J} - \frac{1}{J'}\right) \cdot \dot{C}_E - g \cdot \dot{e} - \frac{k^2}{J'} \cdot \text{sign}(\sigma) \\ &= \dot{\sigma}_{OSS} - \lambda_{OSS} \cdot \dot{e} = \\ &= \dot{\sigma}_{OSS} - \lambda_{OSS} \cdot (\sigma_{OSS} - \lambda_{OSS} \cdot e) \\ &= \dot{\sigma}_{OSS} - \lambda_{OSS} \cdot \sigma_{OSS} + \lambda_{OSS}^2 \cdot e \end{aligned} \quad \text{Equation 54}$$

Hence, since the conditions for the existence of a majorant as required for the sliding modes control are met, we will have the motion on the sliding surface $\sigma_{OSS}$, which tends to zero together with its derivative $\dot{\sigma}_{OSS}$. Therefore, based on the equation 52, the error e of the observer 73 also tends to zero asymptotically and the equation 51 is obtained, which assures the correctness of the estimate made by the observer 73.

The compensator device PSS of the invention has considerable advantages.

One of these advantages is that the compensator device PSS of the invention does not require, for its implementation, the full knowledge of the process parameters to be controlled.

As can be inferred by the above description, the output signal OUT_PSS of the compensator PSS is obtained based on functions linked to the sign of the variable to be controlled ξ(t) and to its derivatives and not based on functions which are directly linked to the values assumed by process parameters.

Unlike traditional compensators, this assures a high robustness and tolerance of the compensators according to the teachings of the invention with respect to uncertainties on the process parameters.

Moreover, the choice of a first order sliding modes control is particularly advantageous in terms of simplicity of construction and robustness of the compensator.

It should also be observed that the examples of embodiments of the invention described above are based on two additional signals to be fed to the compensator PSS (e.g., active power $P_E$ and machine voltage $v_t$) already available on every energy production plant, making the implementation of the teachings of the invention particularly easy.

Note also that it has been noted that the undesired oscillations of the output signal of the compensator OUT_PSS ("chattering" phenomenon), intrinsically present in the sliding modes control circuits, are not relevant in the context of energy production plants. It has been observed that these oscillations (at relatively high frequency) are filtered by the actuators of the exciter 200 and hence do not negatively influence the desired regulation.

The invention claimed is:

1. Compensator device (PSS), particularly for the stabilisation of electromechanical oscillations, intended to provide a reference signal (OUT_PSS) to a voltage regulator device (AVR) of a synchronous alternator (G) for the delivery of electrical power to a distribution network (NET), said device including:
    first processing means (3,4; 4') for receiving electrical measurement signals representing operative parameters characteristics of said synchronous alternator and/or of said network and for generating an electrical signal to be controlled (ξ(t); ω; $P_E$) and a first electrical signal (σ(ξ, t)) corresponding to a sliding surface of the "sliding modes" type,
    second processing means (19, 20) of the first signal (σ(ξ,t)) for generating the reference signal (OUT_PSS) so that it has a first order "sliding modes" profile and it renders substantially constant the amplitude of the signal to be controlled (ξ(t); ω; $P_E$), and bringing said first signal (σ(ξ,t)) substantially to converge to zero.

2. Device (PSS) as claimed in claim 1, wherein the electrical measurement signals include an electrical signal representing an active electrical power ($P_E$) generated by the alternator (G).

3. Device (PSS) as claimed in claim 2, wherein said measurement signals further include a signal representing an electrical voltage ($v_t$) measured at output terminals of said alternator (G), the first processing means being such that the electrical signal to be controlled (ξ(t)) is correlated to the ratio between said electrical signal representing the active power and said electrical signal representing the voltage at the output terminals.

4. Device as claimed in claim 1, wherein the electrical measurement signals include an electrical signal representing a rotor velocity (ω) of the alternator (G).

5. Device as claimed in claim 4, wherein said first electrical signal ($\sigma(\xi,t)$) corresponding to said sliding surface is correlated to said rotor velocity ($\omega$).

6. Device as claimed in claim 1, wherein the electrical measurement power include an electrical signal representing a mechanical quantity ($P_M$; $C_M$) input to the voltage generator and said first electrical signal is correlated to said mechanical quantity.

7. Device as claimed in claim 1, characterised in that it comprises means (73) for estimating an electrical quantity ($P_M$; $C_M$) supplied as input to the voltage generator and in that said first electrical signal ($\sigma(\xi,t)$) is correlated to said mechanical quantity ($P_M$; $C_M$).

8. Device as claimed in claim 6, characterised in that said mechanical quantity is a power ($P_M$).

9. Device as claimed in claim 6, characterised in that said mechanical quantity is a torque ($C_M$).

10. Device (PSS) as claimed in claim 1, wherein said first processing means (3,4) are such as to perform at least one operation of derivation of the first order of at least one of the electrical measurement signals.

11. Device (PSS) as claimed in claim 10, wherein said first processing means (3,4) are such as to perform a derivation operation of the second order of one of the electrical measurement signals.

12. Device (PSS) as claimed in claim 1, wherein said first processing means (3,4) are such as to perform at least one estimate of the derivative of the first order and/or of the second order of at least one of the electrical measurement signal.

13. Device as claimed in claim 10, wherein said first processing means include a second order filter to perform a derivative of the second order of an incoming signal.

14. Device (PSS) as claimed in claim 1, wherein first processing means include a linear or non linear observer for the estimation of said second order derivative.

15. Device (PSS) as claimed in claim 1, wherein first processing means include a Levant observer for the evaluation of said second order derivative.

16. Device (PSS) as claimed in claim 10, wherein said first processing means (3,4) include a device for derivation (4) such as to receive at its input at least the signal to be controlled ($\xi(t)$) to make available at the output a signal correlated to the first time derivative and/or a signal correlated to the second derivative of the signal to be controlled.

17. Device (PSS) as claimed in claim 12, wherein said first processing means include an additional device for derivation (4') such as to receive at its input said signal to be controlled ($\xi(t)$) and another signal indicating the reference voltage requested at the terminals of the alternator (G).

18. Device as claimed in claim 1, wherein said second processing means (5-12) are such as to generate the reference signal (OUT_PSS) in such a way that the latter has a profile that is correlated to a sign function (sign $\sigma$) of said first signal ($\sigma(\xi,t)$).

19. Device as claimed in claim 18, wherein the second processing means (5-12) are such as to generate the reference signal (OUT_PSS) so that it is correlated to said sign function by means of a variable multiplication factor ($f(\sigma)$) depending on the profile of the absolute value of said first signal ($\sigma(\xi,t)$).

20. Device (PSS) as claimed in claim 3, wherein the first processing means are such that, indicating as $$\dot{\hat{\xi}}(t)$$

said electrical signal to be controlled, the first electrical signal $\hat{\sigma}(t)$ substantially assumes the following form:

$$\hat{\sigma}(t) = \left(\frac{d}{dt}+\lambda\right)\cdot\dot{\hat{\xi}}(t).$$

21. Device (PSS) as claimed in claim 20, wherein the second processing means are such that, said reference signal, OUT_PSS, substantially assumes the following form: Out_PSS=H·sign($\dot{\xi}$)·$f(\hat{\sigma})$·sign($\hat{\sigma}$), in which H is a positive gain factor and $f(\hat{\sigma})$ is a generic function.

22. Device (PSS) as claimed in claim 21, wherein said function $f(\hat{\sigma})$ substantially assumes the following form:

$f=1$, $|\hat{\sigma}(t)|/\Phi>1$; $f=|\hat{\sigma}(t)|$, $|\hat{\sigma}(t)|/\Phi<1$.

23. A regulating system of a synchronous alternator (G) for the delivery of electrical power to a distribution network (NET), comprising a voltage regulator (AVR) and a compensator device (PSS), associated to said voltage regulator (AVR) to provide signals (OUT_PSS) for stabilising electromechanical swings, characterised in that said compensator device (PSS) is as claimed in claim 1.

24. A regulating system as claimed in claim 22, wherein said compensator device (PSS) is obtained as a modular element (15) able to be selectively coupled to and removable from said voltage regulator (AVR).

* * * * *